Figure 1:
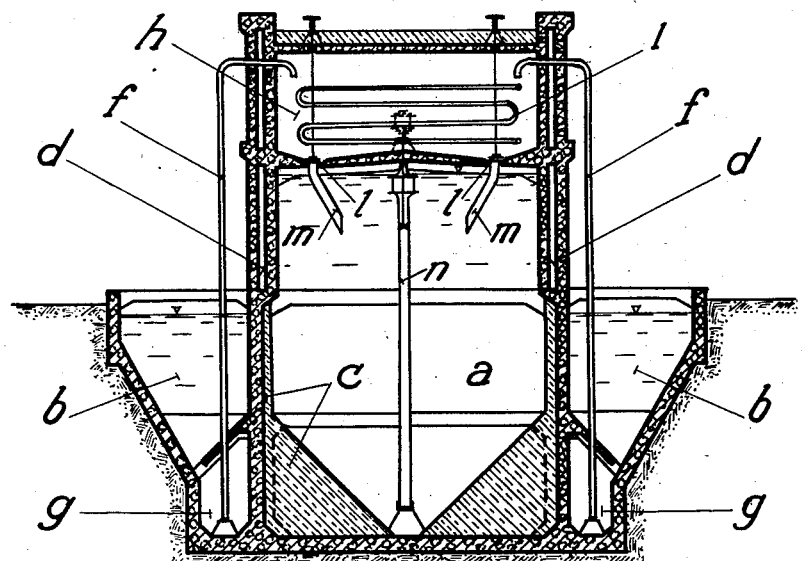

Oct. 10, 1933.  M. PRÜSS  1,930,457

METHOD OF ARTIFICIALLY HEATING SLUDGE DIGESTION CHAMBERS

Filed Dec. 19, 1927

Patented Oct. 10, 1933

1,930,457

UNITED STATES PATENT OFFICE 1,930,457

METHOD OF ARTIFICIALLY HEATING SLUDGE DIGESTION CHAMBERS

Max Prüss, Essen, Germany

Application December 19, 1927, Serial No. 241,217, and in Germany November 15, 1927

2 Claims. (Cl. 210—2)

The optimum of the sludge decomposition in sludge digestion chambers for domestic sewage lies empirically at about 25° centigrade. As the temperature of a digestion chamber at rest is generally rather low in wintertime, attempts have been made to increase the temperature of such digestion chambers by artificial measures which act in two directions and mutually assist themselves. By the first measure artificial heat is supplied to the digestion chamber, and by the second measure it is tried to prevent as much as possible loss of heat from said chamber. A direct heating of the sludge by heating bodies of any kind suspended within the digestion chamber has proved to be unsuccessful because all said heating bodies are soon covered by a film of dried digested sludge and thus cannot act. It has then been proposed to transmit the heat both to the fresh sludge and to the digesting sludge by heating pure water and introducing the same directly into the sludge digestion chamber. Said process has given better results, but it has the drawback that an equal quantity of water to that introduced into the digestion chamber must again be drawn off as digestion chamber water in order to prevent too strong a dilution of the contents in the digestion chamber. The digestion chamber water to be let off removes however therewith an essential portion of the artificially introduced heat and it must further be biologically re-cleaned, to remove its bad odor, before its final escape into a river or the like. Besides, with the removal of the digestion chamber water dissolved putrifying matters are rinsed out of the sludge chamber and thus are lost for their further use as gaseous waste products for gas generation. To this must be added the costs of the pure water and of its heating to the required degree.

According to the present invention, all said drawbacks are avoided by not using heated pure water for a transmission of heat to the interior of the digestion chamber, but by heating the new sludge mostly to be supplied thereto day by day, which generally is fresh sludge, before its introduction into the digestion chamber, to and above the desired temperature in the latter, so that after its being mixed with the other contents therein it transmits the desired temperature thereto. A digestion chamber of a volume of about 1000 cubic metres requires an average daily supply of about 20 to 25 cubic metres of fresh sludge. This fresh sludge quantity need to be heated for some degrees only above the desired average temperature of about 25° centigrade in the digestion chamber, in order to maintain said temperature therein after the introduced heated sludge has been mixed with the total contents in the digestion chamber, which, according to the invention, must be well insulated against heat losses particularly toward the cold underground in which the lower part of the digestion chamber is placed.

It must be taken into account that the heating of the sludge offers particular advantages for a rapid commencement of the methane fermentation by killing the stimulants of the acid fermentation at first prevailing in the sludge. For heating the fresh sludge, suitably, part or all of the digestion gases from the digestion chamber can be used. Of course, said heating can also take place by the employment of any other heating matters or by waste heat of any kind.

Any appropriate arrangement may be used for putting the improved method into practice, all the known kinds of direct or indirect heating being adapted for the purpose in question. Particularly, heating coils can be suspended unobjectionably within the container for heating the fresh sludge because the latter, on the contrary to digested sludge, does not attack metal and furthermore settled sludge films can be easily removed therefrom as said container is wholly emptied at least once per day. As already mentioned, the new sludge to be introduced can already have been subjected to a primary digestion in other chambers.

If the working of the digestion chamber is such that fresh sludge is supplied thereto at long intervals only, it is suitable to regularly supply to the digestion chamber between each two periods of regular introduction of heated fresh sludge, digestion chamber water which has been previously drawn off from said chamber and heated above the desired temperature therein, whereby the required regular heating of the digestion chamber is obtained during the time when no heated fresh sludge is supplied thereto; this measure lying obviously within the scope of the present invention.

The afore-described heat supply to the fresh sludge is to serve for two different purposes:— Part of the quantity of heat supplied serves for heating the fresh sludge to be introduced into the digestion chamber from the average temperature of the sewage of about 10 to 12° centigrade to the desired temperature in the digestion chamber of about 25° centigrade. The other part of the quantity of heat supplied must be carried along with the fresh sludge into the digestion chamber in order to serve as a substitute for that quantity of heat that is continuously delivered through the digestion chamber walls to the underground or to the atmospheric air respectively. Said other part may amount to a multiple of the first part if the digestion chamber is badly insulated. With a good insulation of all sides of the digestion chamber, the heat of loss can be considerably reduced. It is, however, always dependent upon the drop of temperature between the contents of the digestion chamber and the underground or the outer air respectively. The lower half of the digestion chamber is generally located in the ground water, of which the average temperature amounts to about 5 to 6° centigrade, so that just the heat delivery to the underground or to the ground water respectively is generally higher than at the upper part of the digestion chamber to the air or to a dry covering thereon. Due to the fact that the average temperature of sewage amounts to about 10 to 20° centigrade, a further reduction of the heat delivery to the underground can be obtained, beside by a good insulation, by placing the digestion chamber, instead of into the cold ground water, into the warmer sewage.

This can be attained without high extra costs with the employment of a plant in which settling basin and digestion chamber are combined in one juxtaposed arrangement. The employment of such an improved plant has already been proposed by myself for adapting the temperature of the digestion chamber to that of the sewage without the requirement of a particular heating, for which purpose the heat from the settling basin passes to the digestion chamber through the rather thin and non-insulated partition-walls between said basin and said chamber. For the present purpose in question, that is, for maintaining a higher temperature in the digestion chamber than in the settling basin, the partition-walls between said chamber and said basin must, of course, be well insulated against a passage of heat therethrough. The sewage layer is to be considered only as a heat insulating layer between the outer wall of the digestion chamber and the cold underground.

Figure 2:
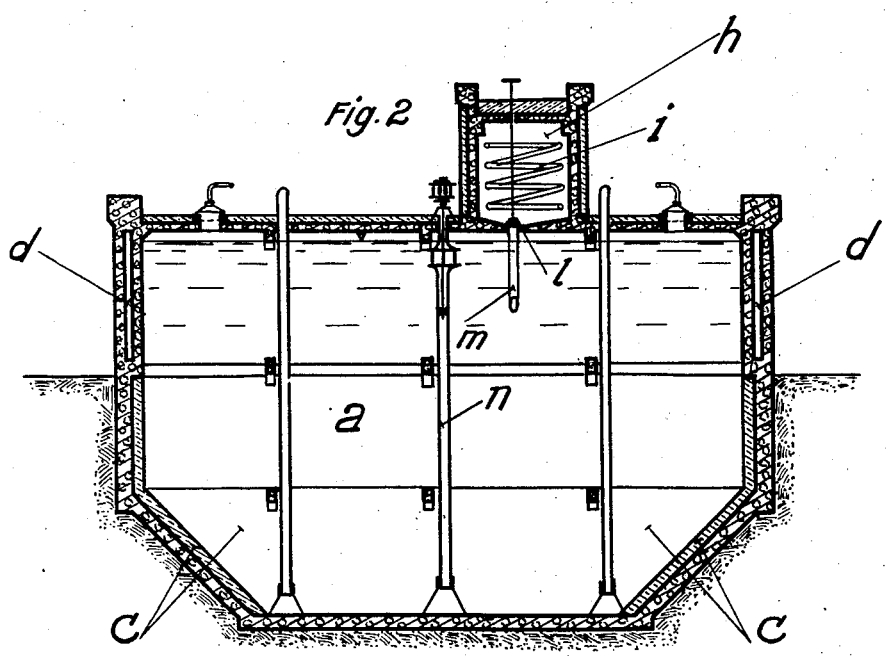

The accompanying drawing shows by way of example a preferred constructional form of the improved plant for putting the improved method into practice: Fig. 1 is a cross-section therethrough, and Fig. 2 is a longitudinal section through the digestion chamber thereof.

The digestion chamber $a$ is heat-insulated against the underground and the settling basin $b$ by the insulating layer $c$ and against the outer air at its upper part by the cavity $d$ in the walls of the latter. The fresh sludge is raised through the sludge pipes $f$ from the lower fresh sludge collecting pockets by means of introduced compressed-air into the intermediary container $h$ arranged above the digestion chamber $a$. The latter is also well heat-insulated. The fresh sludge in said container is heated therein to the required temperature, for instance by means of heating coils $i$, and is then let off through the closable bottom flaps $l$ and the pipes $m$ into the digestion chamber, where it is well mixed with the whole contents therein with the aid of an agitator $n$. It is not essential, although it is of course most suitable, that the sewage chamber $a$ is at the same time used as a settling basin for the sewage. For the purpose in question it would be quite sufficient if the digestion chamber is separated from the surrounding cold underground by a rather thin stream of warm sewage, which construction can be attained with small costs only. In such a construction, the settling chambers $b$, extending along opposite sides of the digestion chamber $a$, serve as the chambers through which is conducted the hot waste water from the digestion chamber.

But even if the two afore-described measures for an artificial heating of the digestion chamber are employed, it will sometimes not be possible to maintain the temperature therein at the desired height of 25° centigrade with the aid of the total output of digestion gas gained from the digestion chamber. This applies to fresh sludge rich in water, such as obtained in the activated-sludge process with a contents of 98 to 99% of water. At the introduction of such a fresh sludge into the digestion chamber to be artificially heated, the total large quantity of water must be heated from the temperature in the settling basin $b$ to the desired temperature in the digestion chamber, in order to be then drawn off and led off as warm digestion chamber water after a few days only. It has been found that the high water contents of the activated sludge are considerably reduced already after a few days' stay of the latter in the digestion chamber. Therefore, it is preferable from the economical point of view to undertake said rapidly proceeding separation of the water from the fresh sludge rich in water within a primary digestion chamber that is not, or little only, artificially heated, and to heat the fresh sludge thus thickened and pre-digested after its introduction into the main digestion chamber. The construction employed for accomplishing this is illustrated in Figure 2. The fresh sludge rich in water is conducted first through conduit $o$ into an antechamber formed on the left hand side of the digestion chamber $a$ and divided off from the main digestion chamber by the partition $p$. In this ante-chamber, which serves as a primary digestion chamber, the sludge is thickened and pre-digested, and thereafter pumped through conduit $q$ into the intermediary container $h$ wherein it is heated. It is then let off through pipes $m$ into the main digestion chamber. Of course, said digestion in two stages can also be advantageously employed in connection with the hitherto known methods of artificially heating digestion chambers. The temperature to be maintained in the first stage of digestion corresponds suitably to the temperature of the fresh sludge, that is, of the sewage, unless the same is too low for a somewhat active digestion. Thus, the digestion in the first stage can also take place, for instance, in the digestion chamber of two-storied plants that is heated by the sewage. For enlarging existing digestion chambers of two-storied plants which by the time have become too small, it has already been proposed to erect separate supplementary chambers into which part of the sludge arriving from the settling basin at the lower digestion chamber is pumped for its perfect digestion and which sometimes are artificially heated, but in this case it was not the intention to undertake the digestion in two stages, as afore described, but to enlarge the too small digestion chambers only. In said known plant, the working is such that part of the sludge is perfectly digested in the lower digestion chamber while the remainder is ripened in the supplementary chamber. On the contrary thereto, according to my improved method, the whole sludge must travel through both digestion chambers, and the whole sludge is let off from the strongly heated main digestion chamber to the drying places.

Finally, if the fresh sludge to be heated and introduced into the digestion chamber for heating the latter to the desired temperature therein, is poor in water such as obtained from screened sewage with a content of below 90% of water, it is suitable, according to the invention, to subject said sludge prior to its main heating to a primary heating by adding thereto warm digestion chamber water, whereby the dry sludge is at the same time sufficiently diluted and thereby made digestible. From Figure 2, it will be seen that in the upper part of the main digestion chamber there is divided off, by means of a partition wall r, a small chamber out of which hot water from the digestion chamber is drawn off by means of the conduit s and conducted into the heating container h for the purpose of diluting any thickened sludge contained therein, prior to its passage into the main digestion chamber.

What I claim, is:—

1. A method of artificially heating sludge digestion chambers, consisting in heating the fresh sludge prior to its regular introduction into said chamber to and above the desired temperature in the latter thereby equalizing in the chamber at its introduction the heat losses toward the outside, regularly supplying to said chamber between each two long periods of regular introduction of heated fresh sludge, digestion chamber water that has been previously drawn off from said chamber and heated above the desired temperature therein.

2. A method of artificially heating sludge digestion chambers, consisting in heating the fresh sludge prior to its regular introduction into said chamber to and above the desired temperature in the latter thereby equalizing in the chamber at its introduction the heat losses toward the outside, subjecting the sludge to a primary heating by adding thereto warm digestion chamber water thereby simultaneously diluting the dry sludge to make it digestable.

MAX PRÜSS.